US012131737B2

(12) United States Patent
Sugimoto

(10) Patent No.: US 12,131,737 B2
(45) Date of Patent: Oct. 29, 2024

(54) VOICE RECOGNITION DEVICE AND VOICE RECOGNITION METHOD

(71) Applicant: Nissan Motor Co., Ltd., Yokohama (JP)

(72) Inventor: Mika Sugimoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 288 days.

(21) Appl. No.: 17/910,378

(22) PCT Filed: Mar. 19, 2020

(86) PCT No.: PCT/JP2020/012349
§ 371 (c)(1),
(2) Date: Sep. 9, 2022

(87) PCT Pub. No.: WO2021/186679
PCT Pub. Date: Sep. 23, 2021

(65) Prior Publication Data
US 2023/0139640 A1    May 4, 2023

(51) Int. Cl.
*G10L 15/22*    (2006.01)
*B60H 1/00*    (2006.01)
(Continued)

(52) U.S. Cl.
CPC .......... *G10L 15/22* (2013.01); *B60H 1/00757* (2013.01); *B60Q 3/80* (2017.02);
(Continued)

(58) Field of Classification Search
CPC ..... G10L 15/22; G10L 15/1815; G10L 15/28; G10L 15/20; G10L 2015/223;
(Continued)

(56) References Cited

U.S. PATENT DOCUMENTS

2013/0253933 A1*  9/2013  Maruta ............... B60R 16/0373
                                                         704/246
2015/0006167 A1*  1/2015  Kato .................. G01C 21/3608
                                                         704/231
(Continued)

FOREIGN PATENT DOCUMENTS

JP       10-248831 A     9/1998
JP     2006-308848 A    11/2006
JP      2019-73255 A     5/2019

OTHER PUBLICATIONS

Ivanecky et al., "An In-Car Speech Recognition System for Disabled Drivers," Text, Speech and Dialogue, Sep. 2012, pp. 505-512, Springer, Germany.

*Primary Examiner* — Yogeshkumar Patel
(74) *Attorney, Agent, or Firm* — Global IP Counselors, LLP

(57) ABSTRACT

A voice recognition device receives requests to control devices installed in a moving body based on instructions voiced by a user. The voice recognition device includes a speech acquisition unit, a speech data conversion unit, a control target device identification unit, a detection mode setting unit and a control request identification unit. The speech acquisition unit acquires speech. The speech data conversion unit converts the acquired speech into speech data. The control target device identification unit that analyzes the speech data to identify the control target device. The detection mode setting unit that sets a detection mode for identifying the control request corresponding to the speech data in accordance with the control target device. The control request identification unit that analyzes the speech data to identify the control request with respect to the control target device, based on the set detection mode.

19 Claims, 10 Drawing Sheets

(51) Int. Cl.
  *B60Q 3/80* (2017.01)
  *B60R 25/31* (2013.01)
  *E05F 15/73* (2015.01)
  *G06F 40/20* (2020.01)
  *G06F 40/30* (2020.01)
  *G10L 15/18* (2013.01)
  *G10L 15/28* (2013.01)

(52) U.S. Cl.
  CPC .............. *B60R 25/31* (2013.01); *E05F 15/73* (2015.01); *G06F 40/20* (2020.01); *G06F 40/30* (2020.01); *G10L 15/1815* (2013.01); *G10L 15/28* (2013.01); *E05Y 2400/45* (2013.01); *E05Y 2400/85* (2013.01); *E05Y 2900/531* (2013.01); *E05Y 2900/548* (2013.01); *E05Y 2900/55* (2013.01); *G10L 2015/223* (2013.01)

(58) Field of Classification Search
  CPC ...... B60H 1/00757; B60Q 3/80; B60R 25/31; B60R 16/0373; E05F 15/73; G06F 40/20; G06F 40/30; E05Y 2400/45; E05Y 2400/85; E05Y 2900/531; E05Y 2900/548; E05Y 2900/55
  See application file for complete search history.

(56) References Cited

U.S. PATENT DOCUMENTS

2017/0166147 A1\* 6/2017 Hiroki ..................... G10L 15/28
2017/0236510 A1   8/2017 Fuchiwaki et al.
2020/0005778 A1\* 1/2020 Kim ................... G10L 15/1815

\* cited by examiner

| | SECOND DETECTION MODE (RULE-BASED RECOGNITION) | FIRST DETECTION MODE (NATURAL LANGUAGE RECOGNITION) |
|---|---|---|
| "TURN ON THE AIR CONDITIONER" (CONTROL REQUEST TEXT) | OK (AIR CONDITIONER ON) | OK (AIR CONDITIONER ON) |
| "POWER ON THE AIR CONDITIONER" | NG | OK (AIR CONDITIONER ON) |
| "WELL, I WANT TO TURN ON THE AIR CONDITIONER" | NG | OK (AIR CONDITIONER ON) |
| "IT WILL GET COLD IF THE AIR CONDITIONER IS TURNED ON" | NG | NG |

FIG. 4

| VEHICLE STATE INFORMATION | POINTS TO ADD TO MISRECOGNITION LEVEL |
|---|---|
| ROOF WINDOW W1 OPEN | 1 |
| DOOR WINDOW W2 OPEN | 1 |
| AIR CONDITIONER AIR VOLUME GREATER THAN OR EQUAL TO REFERENCE AIR VOLUME | 2 |
| (ROOF WINDOW W1 OR DOOR WINDOW W2 OPEN) VEHICLE SPEED GREATER THAN OR EQUAL TO 20 km/h | 2 |
| (ROOF WINDOW W1 OR DOOR WINDOW W2 OPEN) VEHICLE SPEED GREATER THAN OR EQUAL TO 80 km/h | 3 |
| NOISE LEVEL GREATER THAN OR EQUAL TO REFERENCE NOISE LEVEL | 3 |

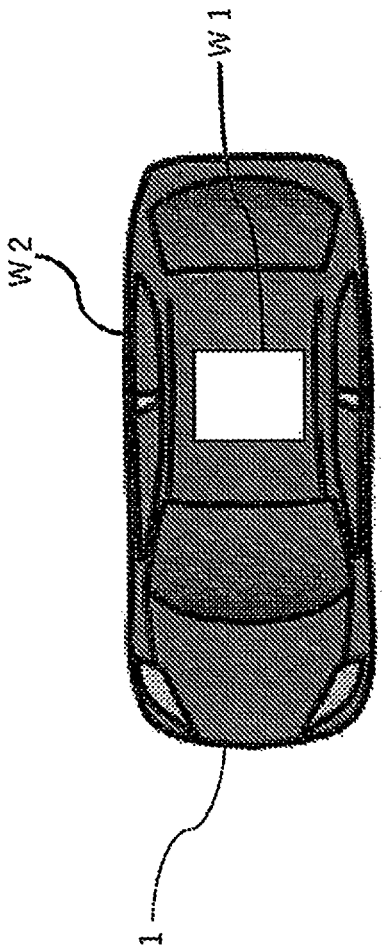

FIG. 8

VOICE RECOGNITION DEVICE AND VOICE RECOGNITION METHOD

CROSS-REFERENCE TO RELATED APPLICATIONS

This application is a U.S. national stage application of International Application No. PCT/JP2020/012349, filed on Mar. 19, 2020.

BACKGROUND

Technical Field

The present invention relates to a voice recognition device and a voice recognition method.

Background Information

A voice recognition device recognizes speech uttered by a user and performs various types of processing based on the voice recognition result. A vehicle equipment control device disclosed in Japanese Laid-Open Patent Application No. 2006-308848 (Patent Document 1) has a keyword detection means that detects keywords, which includes ambiguous words, and, insofar as possible, is able to perform voice recognition in accordance with the user's intentions, even when an instruction by speech uttered by the user is unclear.

SUMMARY

However, when a device installed in a moving body such as a vehicle is controlled by means of the vehicle equipment control device disclosed in Patent Document 1, depending on the type of device, control by means of an unclear instruction may not be suitable.

The problem to be solved by the present invention is to provide a voice recognition device and a voice recognition method that can identify a control request based on an instruction by means of a user's voice, in an appropriate detection mode corresponding to each control target device.

The voice recognition device and voice recognition method according to the present invention sets a detection mode for identifying a control request in accordance with the control target device and identifies a control request based on the set detection mode, thereby solving the problem described above.

By the present invention, since the detection mode can be set in accordance with the control target device, it is possible to identify a control request based on an instruction by means of a user's voice in an appropriate detection mode corresponding to each control target device.

BRIEF DESCRIPTION OF THE DRAWINGS

Referring now to the attached drawings which form a part of this original disclosure.

FIG. 4 is a table illustrating the difference between the voice recognition ranges of a second detection mode based on rule-based recognition and a first detection mode based on natural language recognition.

FIG. 8 is a table showing misrecognition level points that are added in accordance with each vehicle state in the voice recognition method shown in FIG. 7.

DETAILED DESCRIPTION OF EMBODIMENTS

Embodiments of the present invention will be described below based on the drawings.

First Embodiment

Figure 1:
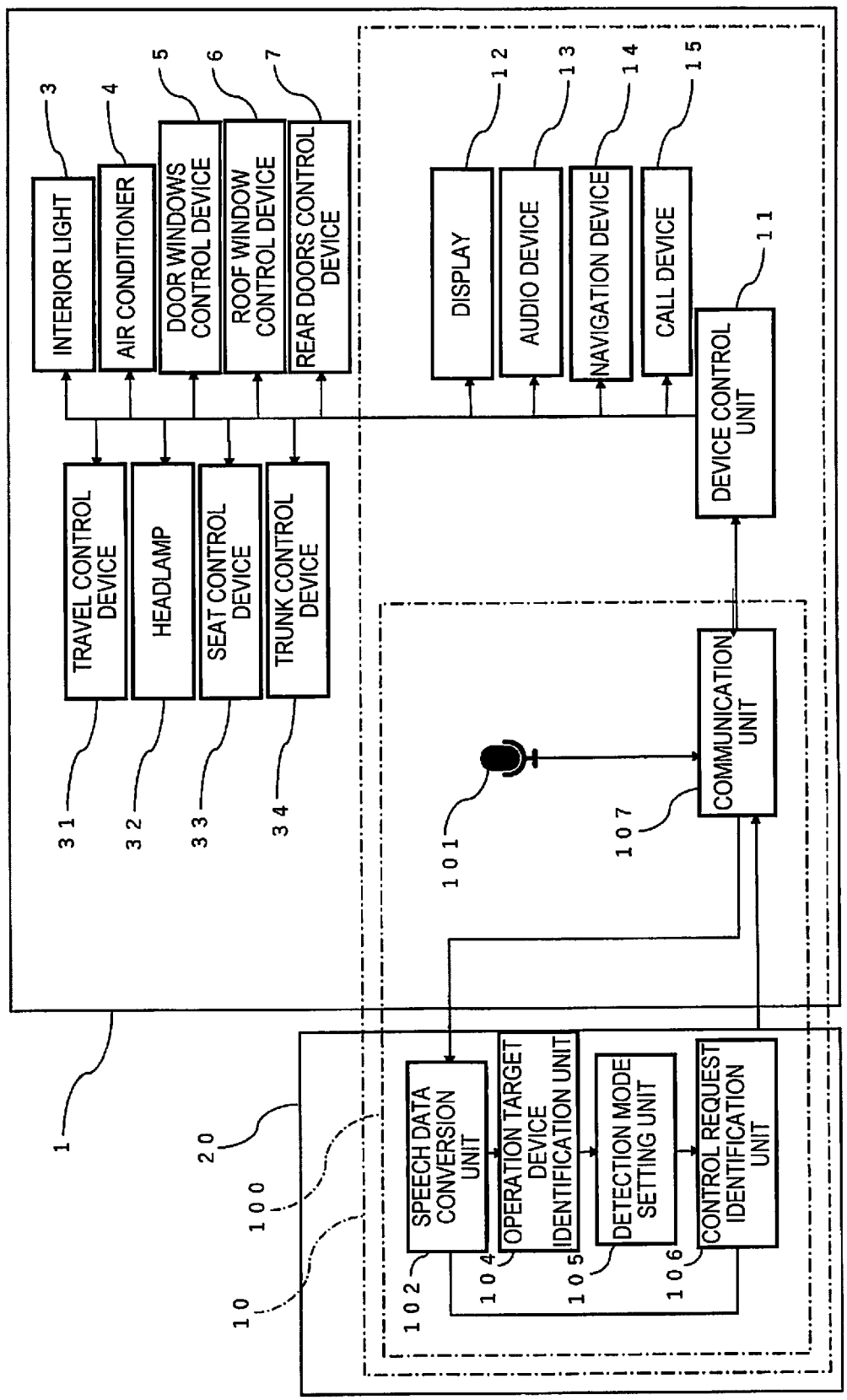
FIG. 1 is a block diagram showing the configuration of a vehicle that utilizes a voice recognition device according to a first embodiment of the present invention.

A voice recognition device 100 according to the first embodiment and a voice recognition method using the voice recognition device 100 will be described with reference to FIGS. 1-4. As shown in FIG. 1, a vehicle 1, which is a moving body, includes the following on-board devices: an interior light 3, an air conditioner 4, a door windows control device 5, a roof window control device 6, a rear doors control device 7, a display 12, an audio device 13, a navigation device 14, a call device 15, a travel control device 31, headlamps 32, seat control devices 33, and a trunk control device 34. Further, the vehicle 1 comprises a device control unit 11 that controls these on-board devices, a speech acquisition unit 101, which is a microphone for inputting voiced instructions from the user, and a communication unit 107 that is connected to the device control unit 11 and the speech acquisition unit 101 by wire or wirelessly and that can communicate with a server 20 outside of the vehicle. The interior light 3, the air conditioner 4, and the audio device 13 are environmental control devices that adjust the ambient conditions of the interior or inside of the vehicle 1. That is, the interior light 3 adjusts the ambient conditions that include light intensity. The air conditioner 4 adjusts the ambient conditions that include temperature. The audio device 13 adjusts the ambient conditions that include sound volume.

Further, the communication unit 107 of the vehicle 1 can communicate wirelessly with the server 20. The server 20 also has a server-side communication unit (not shown) that can communicate with the communication unit 107 of the vehicle 1. The server 20 includes a speech data conversion unit 102, a control target device identification unit 104, a detection mode setting unit 105, and a control request identification unit 106. The display 12, the audio device 13, the navigation device 14, the call device 15, the device control unit 11, the speech acquisition unit 101, and the communication unit 107 provided in the vehicle 1, and the speech data conversion unit 102, the control target device identification unit 104, the detection mode setting unit 105, and the control request identification unit 106 of the server 20 constitute a navigation system 10. The navigation system 10 is, for example, an IVI system. Further, the speech acquisition unit 101 and the communication unit 107 provided in the vehicle 1, and the speech data conversion unit 102, the control target device identification unit 104, the detection mode setting unit 105, and the control request identification unit 106 of the server 20 constitute the voice recognition device 100. That is, the voice recognition device 100 constitutes a part of the navigation system 10. Further, the voice recognition device 100 receives voiced instructions from the user and controls one or more or all of the on-board devices via the device control unit 11. That is, the navigation system 10 has the voice recognition device 100 that receives a request to control various types of devices installed in the vehicle 1 based on voiced instructions from a user in the vehicle 1. The voice recognition device 100 is a voice recognition system.

Figure 3:
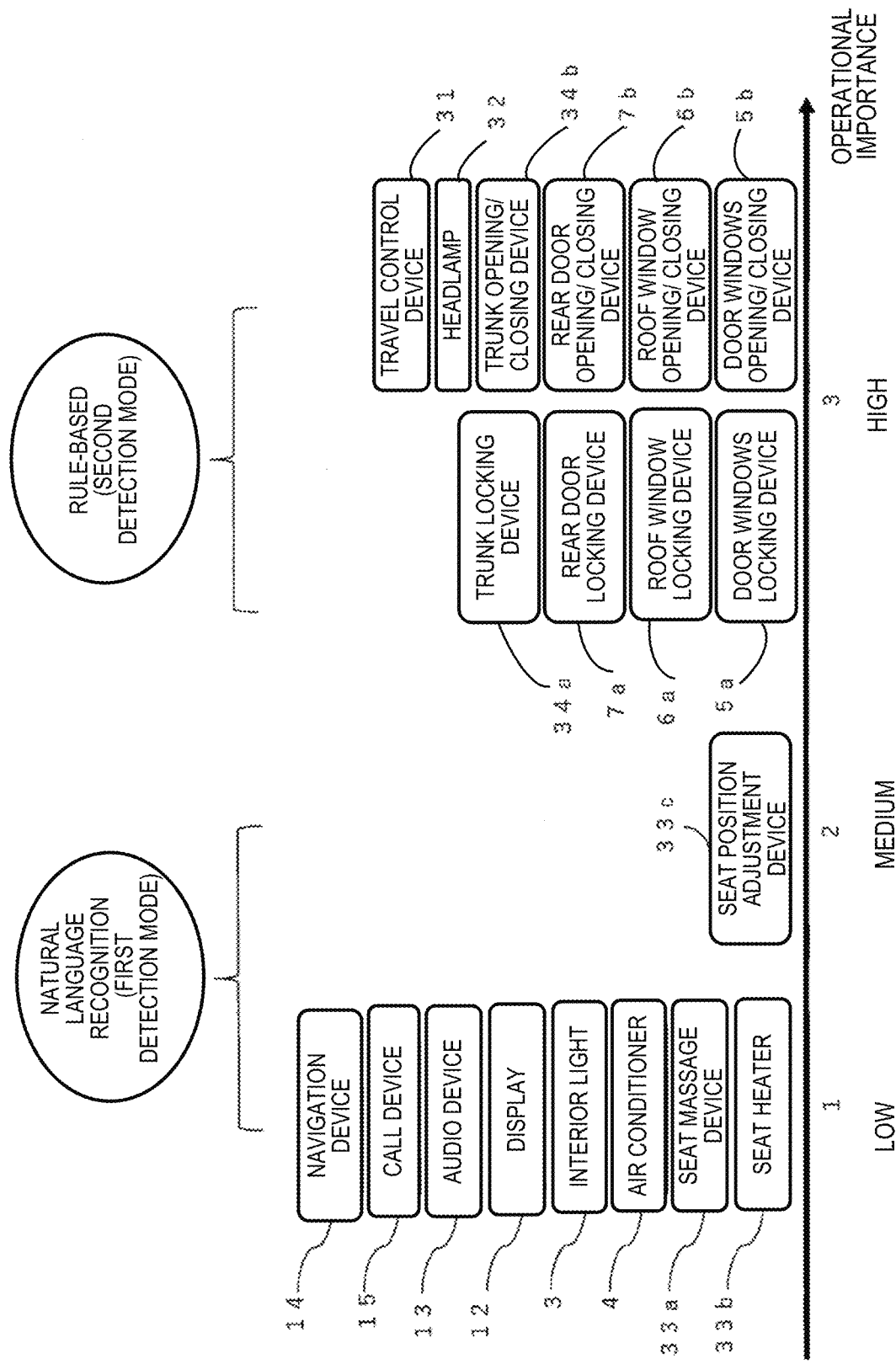
FIG. 3 is a diagram showing an example of a first detection mode target device and a second detection mode target device, which are set in advance by the voice recognition device shown in FIG. 1.

As shown in FIG. 3, the door windows control device 5 includes a door windows locking device 5a and a door windows opening/closing device 5b. The roof window control device 6 includes a roof window locking device 6a and a roof window opening/closing device 6b. The rear doors control device 7 includes a rear doors locking device 7a and a rear doors opening/closing device 7b. The trunk control device 34 includes a trunk locking device 34a and a trunk opening/closing device 34b.

Further, the seat control devices 33 control the various functions of a seat provided in the interior of the vehicle 1 and include a seat massage device 33a, a seat heater 33b, and a seat position adjustment device 33c. The seat position adjustment device 33c can adjust the seat height, the front-rear seat position, and the seat backrest angle.

Further, the travel control device 31 shown in FIG. 1 controls the travel of the vehicle 1 when autonomous driving mode is selected as the travel mode of the vehicle 1. Specifically, the travel control device 31 controls a drive actuator, a steering actuator, and a brake actuator of the vehicle 1.

The display 12 is a touch panel display equipped with an input function that allows the user to input control instructions to the audio device 13, the navigation device 14, the call device 15, and other on-board devices by means of touch operations. Further, the display 12 can output information regarding incoming calls to the call device 15, information regarding callers speaking via the call device 15, and guidance information from the navigation device 14, and the like, as images that include text information and icons. Further, the audio device 13 can output audio that reports incoming calls to the call device 15, audio of the called party speaking through the call device 15, audio providing guidance information from the navigation device 14, and the like. The display 12 is not limited to a touch panel display with an input function, but may be any device that outputs 2D or 3D images that include text information. Further, the display 12 is not limited to a display provided in the dashboard of the vehicle 1, but may also be a windshield projection heads-up display or various other displays. The display 12 and the audio device 13 constitute an information provision device.

The speech data conversion unit 102 of the server 20 receives information the speech acquired by the speech acquisition unit 101 via the communication unit 107 and converts the information to speech data. Speech data are speech-based text data.

Further, the control target device identification unit 104 of the server 20 analyzes the speech data converted by the speech data conversion unit 102 and identifies the control target device to be operated from keywords included in the speech data. A control target device is one or more of the following on-board devices, for example: the interior light 3, air conditioner 4, the door windows control device 5, the roof window control device 6, the rear doors control device 7, the display 12, the audio device 13, the navigation device 14, the call device 15, the travel control device 31, the headlamps 32, the seat control devices 33, and the trunk control device 34. When identifying a control request, the control target device identification unit 104 refers to dictionary data and context data stored in the server 20. Further, depending on the control target device, the control target device identification unit 104 pre-sets each control target device as a first detection mode target device or a second detection mode target device. The control target device identification unit 104 refers to target device information, in which each control target device is pre-set as a first detection mode target device or a second detection mode target device, in order to determine whether the identified control target device is the first or the second detection mode target device. The first detection mode target device is a device for which a first detection mode based on natural language recognition, described further below, is to be used, when a control request is identified. The second detection mode target device is a device for which a second detection mode based on rule-based recognition, described further below, is to be used, when a control request is identified. Information indicating whether the "control target device is the first or the second detection mode target device," as determined by the control target device identification unit 104 (hereinafter also referred to as determination information), is then output to the display 12 and/or the audio device 13 via the communication unit 107 or the device control unit 11 on the vehicle 1 side. That is, the determination information indicating whether the identified control target device is the first detection mode target device or the second detection mode target device is displayed on the display 12 as an image that includes video or text, or output as audio by the audio device 13. Further, the determination information of the control target device set by the control target device identification unit 104 is output to the detection mode setting unit 105.

The detection mode setting unit 105 sets a detection mode for identifying the control request corresponding to the speech data converted by the speech data conversion unit 102 in accordance with the determination information of the control target device determined by the control target device identification unit 104. Specifically, the detection mode setting unit 105 sets the detection mode to either a first detection mode based on the natural language recognition, described further below, or a second mode based on rule-based recognition, described further below, in accordance with the determination information of the control target device. The detection mode information set by the detection mode setting unit 105 is output to the display 12 and/or the audio device 13 via the communication unit 107 and the device control unit 11 on the vehicle 1 side. That is, information indicating whether the current detection mode is set to the first detection mode or the second detection mode (hereinafter also referred to as "detection mode setting information") is displayed on the display 12 as an image including video or text, or output as audio by the audio device 13. Further, the detection mode setting information indicating the detection mode set by the detection mode setting unit 105 is output to the control request identification unit 106.

The control request identification unit 106 analyzes the speech data converted by the speech data conversion unit 102 and identifies the contents of the control request with respect to the control target device based on the detection mode set by the detection mode setting unit 105. In a similar manner to the control target device identification unit 104, the control request identification unit 106 refers to dictionary data and context data stored in the server 20 when identifying a control request. The control request identification unit 106 then transmits the contents of the control request with respect to the identified control target device to the device control unit 11 via the communication unit 107 on the vehicle 1 side. The device control unit 11 controls the control target device based on the contents of the control request with respect to the control target device and the received information regarding the control target device.

Next, the procedure of the voice recognition method by means of the voice recognition device 100 will be described using the flowchart shown in FIG. 2.

First, in Step S1, the speech acquisition unit 101 of the voice recognition device 100 on the vehicle 1 side acquires speech uttered by the user. Specifically, the speech acquisition unit 101 detects that the user has spoken based on frequency, and, when the user's speech is detected, acquires speech information containing speech uttered by the user as the voice recognition target. In this manner, as a result of the speech acquisition unit 101 acquiring speech information only when the user is speaking, the control load on the voice recognition device 100 can be reduced compared with the case in which speech information is constantly acquired. Further, if a specific keyword indicating the start of a voiced instruction is set in advance, the speech acquisition unit 101 may acquire speech information as the voice recognition target immediately after the user utters the specific keyword.

Next, in Step S2, the speech data conversion unit 102 of the voice recognition device 100 on the server 20 side converts the acquired speech into speech data that can be recognized as text.

Next, in Step S3, the control target device identification unit 104 analyzes the speech data converted by the speech data conversion unit 102 and identifies the target device to be controlled. The control target device identification unit 104 analyzes the speech data by means of natural language recognition to identify the control target device. Specifically, if the user voices "open the roof window," the control target device identification unit 104 refers to the dictionary data and the context data to identify the control target device as the roof window opening/closing device 6*b*. Further, even if the user utters a spoken instruction such as "open the upper window," "open the roof," or the like, the control target device identification unit 104 determines that the "upper window" or "roof" in this case means the roof window and identifies the control target device as the roof window opening/closing device 6*b*. That is, the control target device identification unit 104 is able to identify the control target device even if the user's voiced speech data do not match the predefined control request text.

Next, in Step S4, the control target device identification unit 104 determines whether the control target device identified in Step S3 is a first detection mode target device. Here, the method for determining whether the control target device is a first detection mode target device, or a second detection mode target device and not a first detection mode target device, will be described with reference to FIG. 3.

In the example shown in FIG. 3, the on-board devices of the vehicle 1 are preliminarily divided into three categories in accordance with their operational importance. The operational importance is the degree to which the control of the on-board device affects the driving conditions of the vehicle 1 or the user riding in the vehicle 1. Thus, since an on-board device with a higher operational importance has a greater effect on the way the vehicle 1 is being driven, there is a greater demand to bring the probability of misrecognition of the control request as close to zero as possible. That is, the higher the operational importance of a control target device, the more the more accurately and reliably must the control request identified by the voice recognition device 100 match the actual voiced instruction of the user.

Specifically, the navigation device 14, the call device 15, the audio device 13, the display 12, and interior light 3, the air conditioner 4, the seat massage device 33*a*, and the seat heater 33*b* are classified under operational importance category "1 (Low)." These accessory devices are thought to have little effect on the driving, and thus are classified as having the lowest operational importance. On the other hand, the seat position adjustment device 33*c* is classified under operational importance category "2 (Medium)." That is, the position and height of the seat in which the user is seated can affect the user's driving of the vehicle 1, so that the seat position adjustment device 33*c* has greater operational importance than the seat massage device 33*a* and the seat heater 33*b*. Further, the travel control device 31, the headlamps 32, the door windows locking device 5*a*, the door windows opening/closing device 5*b*, the roof window locking device 6*a*, the roof window opening/closing device 6*b*, the rear doors locking device 7*a*, the rear doors opening/closing device 7*b*, the trunk locking device 34*a*, and the trunk opening/closing device 34*b* have a significantly large impact on the user and the driving of the vehicle 1, and thus are classified under operational importance category "3 (High)." The control target device identification unit 104 determines the on-board devices classified into the "1 (Low)" operational importance category and the on-board devices classified into the "2 (Medium)" operational importance category as first detection mode target devices. Further, the control target device identification unit 104, determines the on-board devices classified into the "3 (High)" operational importance category as second detection mode target devices.

The distinction between a first detection mode target device and a second detection mode target device is preset for each on-board device, but the control target device identification unit 104 can change the setting of the first detection mode target device and the second detection mode target device as deemed necessary.

Figure 2:
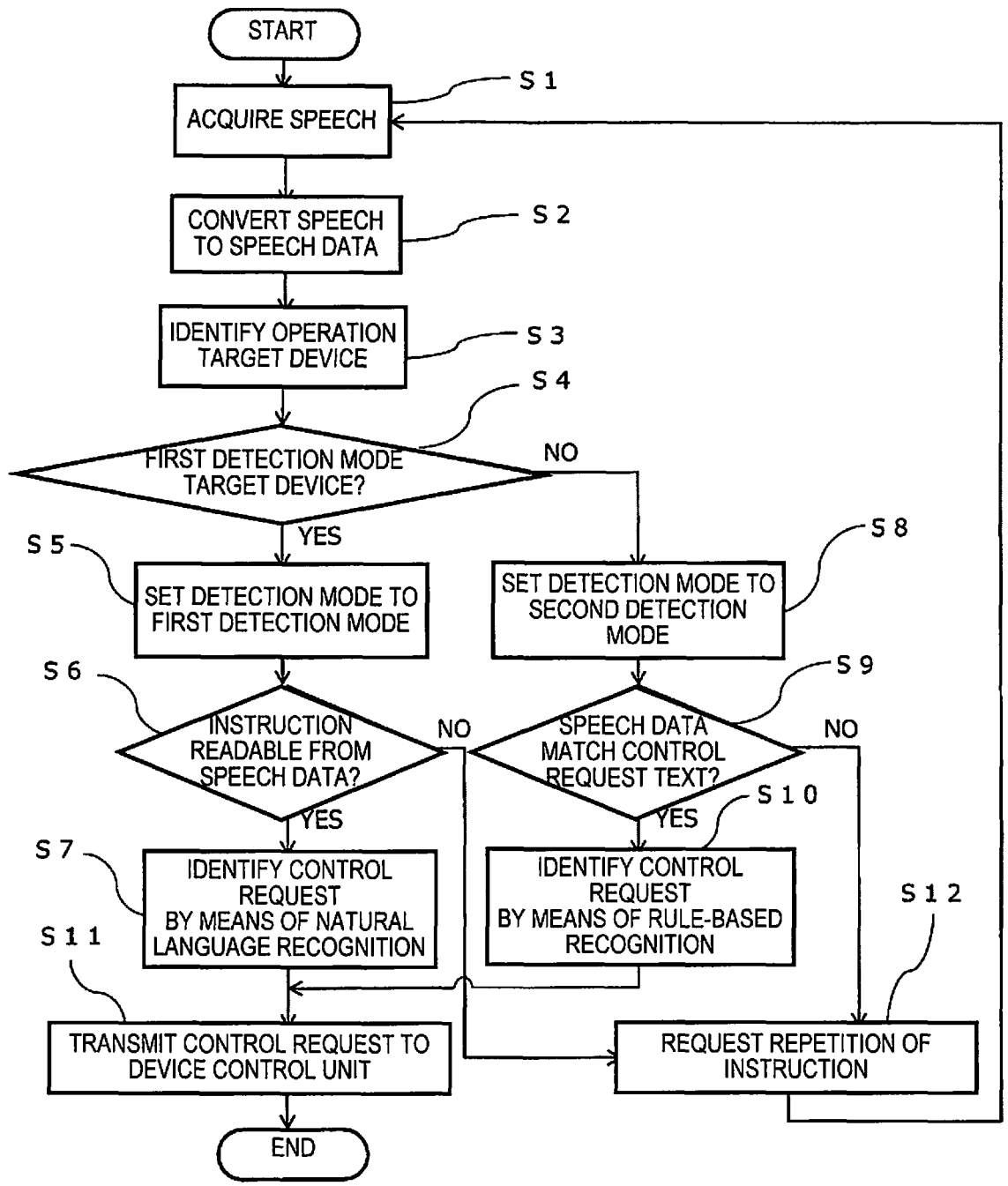
FIG. 2 is a flowchart showing a voice recognition method that uses the voice recognition device shown in FIG. 1.

Next, as shown in FIG. 2, in Step S4, if it is determined that the control target device is a first detection mode target device, then in Step S5, the detection mode setting unit 105 sets the detection mode to the first detection mode. Then, in Step S6, the control request identification unit 106 determines whether the contents of the user's instruction can be read from the speech data converted in Step S2 by means of natural language recognition. Whether the contents of the instruction can be read is determined based on whether the control request identification unit 106 is able to interpret the speech data converted by the speech data conversion unit 102 based on natural language recognition with reference to the dictionary data and the context data and thus identify the contents of the control request. If the instruction cannot be read from the speech data, in Step S12, the voice recognition device 100 asks the user to repeat the instruction. This is presented to the user as an image containing text on the display 12 or by the audio device 13 providing voiced guidance. On the other hand, if the instruction contents can be read from the speech data, in Step S7 the control request identification unit 106 identifies the control request with respect to the control target device. That is, the control request identification unit 106 interprets the speech data converted by the speech data conversion unit 102 based on natural language recognition with reference to the dictionary data and the context data and thus identifies the contents of the control request. In Step S11, the identified control request is transmitted to the device control unit 11 of the vehicle 1 in order to control the control target device, and the process comes to an end.

In Step S4, if it is determined that the control target device is not a first detection mode target device, that is, if it is determined that the control target device is a second detection mode target device, in Step S8 the detection mode setting unit 105 sets the detection mode to the second detection mode. Then, in Step S9, it is determined whether the speech data converted in Step S2 match a predefined control request text; if not, in Step S12, the user is asked to repeat the instruction. Asking the user to repeat the instruction is a process of proposing or requesting that the user redo the voiced input (utterance of an instruction). At this time, the control request identification unit 106 outputs to the display 12 or the audio device 13, via the communication unit 107 and the device control unit 11 of the vehicle 1, information guiding the user to redo the instruction (voiced input/utterance) so that the speech data will match the control request text.

On the other hand, if the speech data match the control request text, in Step S10 the control request identification unit 106 identifies the control request corresponding to the control request text by means of the second detection mode based on rule-based recognition. In Step S11, the identified control request is transmitted to the device control unit 11, via the communication unit 107 of the vehicle 1, to control the control target device, and the flow ends.

The determination of whether the speech data in the rule-based recognition match the control request text is executed by comparing the control request text with all of the speech data (text data) based on the speech input in Step S1. All of the speech data are based on speech that is input from the beginning to the end of the utterance. That is, the control request identification unit determines whether the control request text matches the speech data based on the series of voiced sounds from beginning to end of the utterance.

Here, the difference between the first detection mode based on natural language recognition and the second detection mode based on rule-based recognition will be described using FIG. 4. FIG. 4 shows the difference between the first detection mode and the second detection mode in a case in which the control target device is an air conditioner and the contents of the control request is "I want to turn ON the air conditioner." In the example shown in FIG. 3, the air conditioner 4 is specified as the first detection mode target device, but in the example shown in FIG. 4, for convenience of the explanation, either the first detection mode or the second detection mode may be applied for the identification of the control request to the air conditioner 4.

As shown in FIG. 4, if the control target device is an air conditioner and the contents of the control request is "I want to turn ON the air conditioner," the control request text corresponding to the contents of this control request is predefined as "turn on the air conditioner."

In the second detection mode based on rule-based recognition, if it is determined that the speech data based on speech uttered by the user match the control request text, the control request with respect to the air conditioner, which is the control target device, is identified (refer to FIG. 2, Step S10). That is, in the example shown in FIG. 4, in the case that the detection mode setting unit 105 sets the detection mode to the second detection mode, the device control unit 11 turns the power to the air conditioner 4 ON only when the user utters "turn on the air conditioner" in accordance with the defined control request text. Therefore, if the user voices an utterance that does not match a control request text, for example "power on the air conditioner," "well, I want to turn on the air conditioner," or "it will get cold if the air conditioner is turned on," the device control unit 11 does not turn ON the power to the air conditioner 4, and maintains the OFF state.

In the first detection mode based on natural language recognition, even in a case that the user utters something different than "turn on the air conditioner," which is the control request text, the device control unit 11 turns the power to the air conditioner 4 ON when the user utters "power on the air conditioner" or "well, I want to turn on the air conditioner," for example. Specifically, if the user utters "power on the air conditioner," the control request identification unit 106 separates the speech data into "air conditioner" and "power on," refers to the dictionary data, and determines that "power on" is a synonym for "turn on," thereby identifying the control request "I want to turn ON the air conditioner." In the dictionary data used in the first detection mode, one registered word and another word having the same meaning and content as this word are stored in association with each other as synonyms. Further, if the user utters "well, I want to turn on the air conditioner," the control request identification unit 106 determines that "well" is an interjection, and thus a word that has no meaning, and that "well, I want to turn on the air conditioner" is speech data that have the same meaning as the request "turn on the air conditioner." The control request identification unit 106 thereby identifies the control request "I want to turn ON the air conditioner" based on the speech data "well, I want to turn on the air conditioner."

In other words, the range of speech data that can be recognized for each control request is narrower in the second detection mode based on rule-based recognition than in the first detection mode based on natural language recognition. That is, since the second detection mode based on rule-based recognition identifies only control requests for which the control request text is defined, the range of the speech data that can specify the contents of the control request is limited in accordance with the number of the defined control requests. Further, since the second detection mode based on rule-based recognition identifies only control requests that match a defined control request text, the speech data that can be identified in the second detection mode (that can be input in the second detection mode) are limited. That is, when the detection mode is set to the second detection mode, the degree of flexibility of voiced input will be lower than when the detection mode is set to the first detection mode. Therefore, the conditions for identifying the control request are stricter in the second detection mode than in the first detection mode.

In other words, the first detection mode based on natural language recognition has a wider range of speech data that can be recognized in accordance with each control target device and control request than the second detection mode based on rule-based recognition. That is, the conditions for identifying the control target device and the control request are more relaxed in the first detection mode than in the second detection mode.

On the other hand, if the user utters "it will get cold if the air conditioner is turned on," the control request identification unit 106 analyzes the combination of words and their order in accordance with the dictionary data and the context data, and infers that the user's voiced instruction means "if the air conditioner is turned ON, the interior temperature of the vehicle will fall below a suitable temperature, so I do not want to turn ON the air conditioner." Therefore, the control request identification unit 106 does not transmit an instruction to turn ON the air conditioner 4 to the device control unit 11 of the vehicle 1. That is, if the user utters "it will get cold if the air conditioner is turned on," the power to the air conditioner 4 is kept in the OFF state and is not turned ON regardless of whether the detection mode is set to the first detection mode or the second detection mode.

The control request identification unit 106 of the voice recognition device 100 can learn the pattern of correspondence between the speech data and the contents of the user's actual instructions, and periodically update the dictionary data and the context data.

From the foregoing, the voice recognition device 100 and the voice recognition method using the voice recognition device 100 according to the present embodiment set a detection mode for identifying a control request corresponding to the speech data in accordance with the control target device and identify a control request based on the set detection mode. Therefore, the voice recognition device 100 is able to identify the control request based on the user's voiced instruction in a suitable detection mode corresponding to each control target device.

Furthermore, the voice recognition device 100 sets the detection mode to the first detection mode that analyzes the speech data by means of natural language recognition when the identified control target device is a first detection mode target device, and sets the detection mode to the second detection mode that analyzes the speech data by means of voice recognition of a means different from natural language recognition when the identified control target device is a second detection mode target device. That is, in accordance with the control target device, the voice recognition device 100 can set the detection mode to either the first detection mode that uses natural language recognition or the second detection mode that uses voice recognition of a means different from natural language recognition. Further, the second detection mode has a narrower and more limited range of speech data that can be recognized in accordance with each control request than the first detection mode. Therefore, depending on the control target device, the voice recognition device 100 can use the first detection mode based on natural language recognition, which accepts ambiguous voiced instructions (instructions with a high degree of flexibility), or the second detection mode based on voice recognition, which is less flexible but more accurate than natural language recognition. When speech data using natural language recognition are analyzed, the number of target words to be recognized by the control request identification unit 106 may increase, and the speech data may contain words that have multiple meanings. Therefore, if the detection mode is set to the first detection mode, the probability of misrecognition of the control request is higher than when the detection mode is set to the second detection mode. Thus, for example, when a control instruction is issued with respect to a control target device that has high operational importance and for which an ambiguous voiced instruction is not suitable, the voice recognition device 100 can select the second detection mode as the detection mode to be used, which is expected to carry out highly accurate voice recognition. On the other hand, when a control instruction is issued with respect to a control target device whose operational importance is not very high, the voice recognition device 100 can select the first detection mode, which has a wide range of voice recognition, and a high degree of flexibility of speech that can be input.

Further, if the detection mode is set to the second detection mode, the voice recognition device 100 determines whether the speech data match a predefined control request text. Then, if it is determined that the speech data match the control request text, the voice recognition device 100 identifies the control request corresponding to the control request text. That is, the second detection mode is a detection mode for analyzing the speech data by means of rule-based recognition. Therefore, for example, when a control request is identified with respect to the control target device that has a high operational importance and for which voice recognition by means of natural language recognition is not suitable, the voice recognition device 100 can select the second detection mode for analyzing speech data by means of rule-based recognition. Thus, when a control request is identified with respect to the control target device for which voice recognition by means of natural language recognition is not suitable, the voice recognition device 100 can improve the degree of certainty of voice recognition and prevent misrecognition of the user's voiced instruction.

Further, when the second detection mode is set and the speech data based on a voiced instruction do not match the control request text, the voice recognition device 100 guides the user to redo the voiced instruction. As a result, if the detection mode is set to the second detection mode, the voice recognition device 100 can prompt the user to voice an instruction in a manner that enables rule-based recognition.

Further, when the control target device is identified to be the travel control device 31 for controlling the travel of the vehicle 1, the control target device identification unit 104 determines that the control target device is a second detection mode target device. Since the control of the drive actuator, steering actuator, or brake actuator of the vehicle 1 by the travel control device 31 significantly affects the travel state of the vehicle 1, the operational importance of the travel control device 31 is particularly high. Therefore, when the control target device identification unit 104 determines that the travel control device 31 is a second detection mode target device, the control request identification unit 106 can reliably and accurately identify the control request with respect to the travel control device 31. Thus, the stability of the travel state of the vehicle 1 is maintained.

Further, when the control target device is identified to be the locking device of a door, window, or the trunk, or the opening/closing device of a door, window, or the trunk of the vehicle 1, the control target device identification unit 104 determines that the control target device is a second detection mode target device. That is, the control target device identification unit 104 pre-sets the door windows locking device 5a, the door windows opening/closing device 5b, the roof window locking device 6a, the roof window opening/closing device 6b, the rear doors locking device 7a, the rear doors opening/closing device 7b, the trunk locking device 34a, and the trunk opening/closing device 34b as second detection mode target devices. Whether a door, window, or the trunk of the vehicle 1 is locked, and whether a door, window, or the trunk is open have a great effect on the travel state of the vehicle 1 as well as on the user in the vehicle 1. Thus, the operational importance of the door windows locking device 5a, the door windows opening/closing device 5b, the roof window locking device 6a, the roof window opening/closing device 6b, the rear doors locking device 7a, the rear doors opening/closing device 7b, the trunk locking device 34a, and the trunk opening/closing device 34b is particularly high. When the control target device identification unit 104 determines that these locking devices and opening/closing devices are second detection mode target devices, the control request identification unit 106 can reliably and accurately identify the control request with respect to the door windows control device 5, the roof window control device 6, the rear doors control device 7, and the trunk control device 34. Thus, the stability of the travel state of the vehicle 1 is maintained.

When the control target device is identified to be an environment adjustment device that adjusts the environmental conditions including at least one of the temperature, light intensity, and sound volume inside the vehicle 1, that is, the interior light 3, the air conditioner 4, or the audio device 13, the control target device identification unit 104 determines that the control target device is a first detection mode target device. The interior light 3, the air conditioner 4, and the audio device 13 have lesser effects on the user and the travel state of the vehicle 1 than the travel control device 31 or a locking device or an opening/closing device of doors, etc. As a result, as shown in FIG. 3, the operational importance of the interior light 3, the air conditioner 4, and the audio device 13 is "1 (Low)." Therefore, when the control target device identification unit 104 determines that the interior light 3, the air conditioner 4, or the audio device 13 is a first detection mode target device, the control request identification unit 106 can use the first detection mode, which has a high degree of flexibility of speech that can be input, to identify the control requests to these devices. The user can thus issue instructions to control the ON/OFF of the interior light 3, the air conditioner 4, or the audio device 13, or to control the light intensity of the interior light 3, or the air volume of the air conditioner 4, or to set the volume of the audio device 13 more intuitively, by using a variety of patterns of speech.

When the control target device is identified as the seat control device 33 for controlling the state of a seat in the vehicle 1, that is, as the seat massage device 33a, the seat heater 33b, or the seat position adjustment device 33c, the control target device identification unit 104 determines that the control target device is a first detection mode target device. The seat control devices 33 have a lesser effect on the user and the travel state of the vehicle 1 than the travel control device 31 or a locking device or an opening/closing device for doors, etc. Thus, as shown in FIG. 3, the operational importance of the seat massage device 33a, and the seat heater 33b is "1 (Low)," and the operational importance of the seat position adjustment device 33c is "2 (Medium)." Therefore, when the control target device identification unit 104 determines that the seat massage device 33a, the seat heater 33b, or the seat position adjustment device 33c is a first detection mode target device, the control request identification unit 106 can use the first detection mode, which that has a high degree of flexibility of speech that can be input, to identify the control request of each of the seat control devices 33. The user can thus issue an instruction to control more intuitively the switching of the massage strength of the seat massage device 33a, the temperature of the seat surface heated by the seat heater 33b, or the height, position, etc., of the seat adjusted by the seat position adjustment device 33c by using a variety of patterns of speech (speech with high degree of flexibility).

When the control target device is identified as an information provision device for providing information to the user, that is, as the display 12 or the audio device 13, the control target device identification unit 104 determines that the control target device is a first detection mode target device. The display 12 and the audio device 13 have lesser effects on the user and the travel state of the vehicle 1 than the travel control device 31 or a locking device or opening/closing device for doors, etc. As a result, as shown in FIG. 3, the operational importance of the display 12 and the audio device 13 is "1 (Low)." Therefore, when the control target device identification unit 104 determines that the display 12 or the audio device 13 is a first detection mode target device, the control request identification unit 106 can use the first detection mode, which has a high degree of flexibility of speech that can be input, to identify the control request. The user can thus more intuitively issue instructions to control the ON/OFF of the display 12 or the audio device 13, or to control the brightness of the screen or the size of the text of the display 12, or to set the volume of the audio device 13 by using a variety of patterns of speech.

The audio device 13 is an environment adjustment device that adjusts the environmental conditions of the interior of the vehicle 1 as well as an information provision device. Further, the information provision device is not limited to the display 12 or the audio device 13, but may include a meter panel (not shown), or the like.

Further, the control target device identification unit 104 analyzes the speech data based on natural language recognition to identify the control target device in Step S3 shown in FIG. 2. As a result, the control target device identification unit 104 can identify the control target device even if the user voices an instruction in a manner that does not match the control request text.

In this embodiment, the speech data conversion unit 102, the control target device identification unit 104, the detection mode setting unit 105, and the control request identification unit 106 are provided in the server 20, but some of these functions may be provided in the vehicle 1.

Second Embodiment

Figure 5:
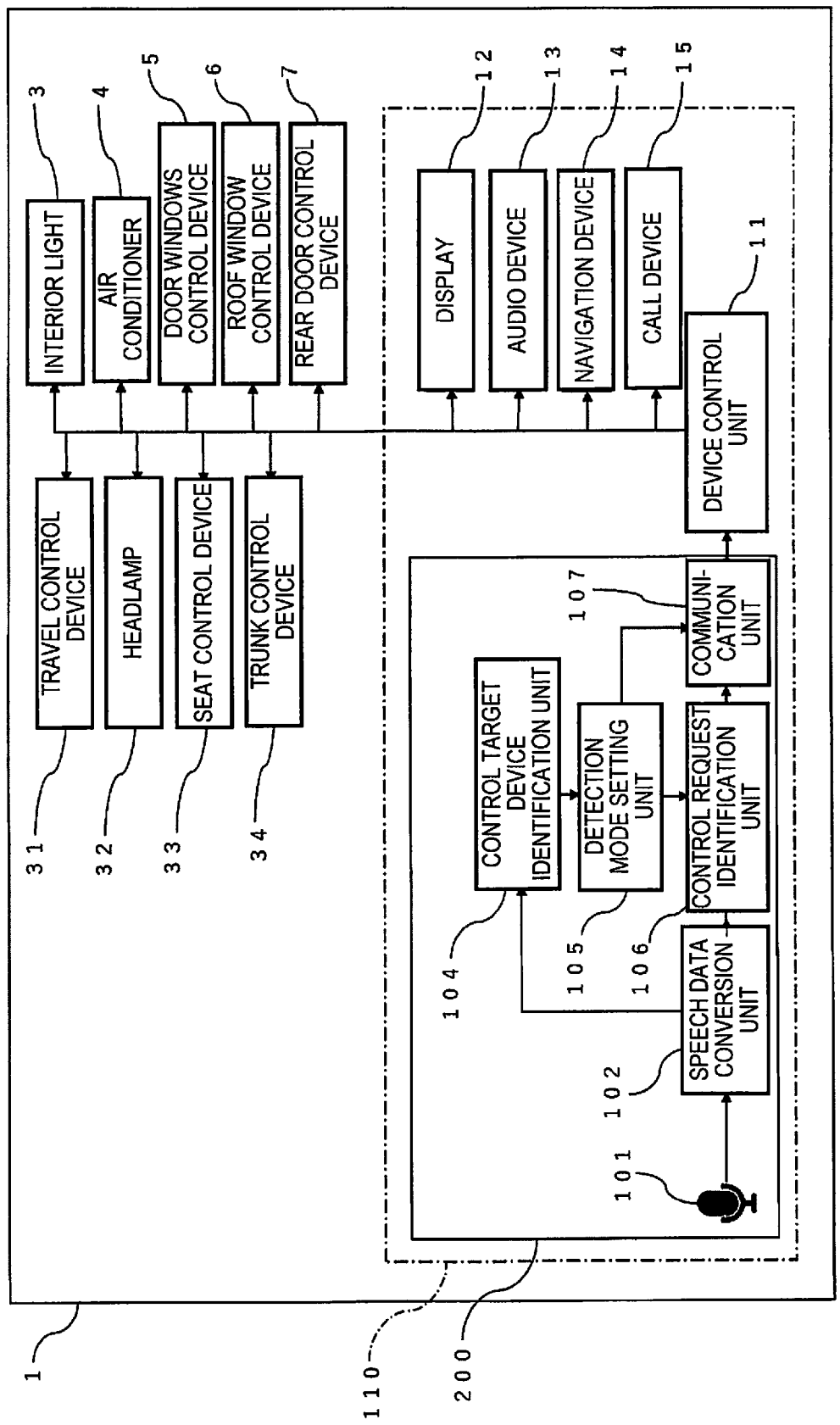
FIG. 5 is a block diagram showing the configuration of a vehicle that includes a voice recognition device according to a second embodiment of the present invention.

The configuration of the vehicle 1 including a voice recognition device 200 according to a second embodiment is shown in FIG. 5. In the following description, the same reference numerals as those shown in FIGS. 1-4 indicate the same or similar constituent elements or steps, so that their detailed explanations have been omitted. As shown in FIG. 5, the vehicle 1 has a navigation system 110 that controls one or more or all of the display 12, the audio device 13, the navigation device 14, and the call device 15 by means of voiced input. The navigation system 110 has the voice recognition device 200, which receives requests to control various types of devices installed in the vehicle 1 based on instructions voiced by the user in the vehicle 1. The speech acquisition unit 101, the speech data conversion unit 102, the control target device identification unit 104, the detection mode setting unit 105, the control request identification unit 106, and the communication unit 107 constituting the voice recognition device 200 are all provided in the vehicle 1. The detection mode setting unit 105 and the control request identification unit 106 can exchange data or signals with the device control unit 11 via the communication unit 107. The voice recognition device 200 identifies a control request with respect to the control target device by means of the same procedure as the voice recognition method shown in FIG. 2.

As described above, similarly to the speech recognizer 100 of the first embodiment, the speech recognizer 200 of this embodiment sets a detection mode for identifying control requests corresponding to speech data according to the control target device and identifies control requests based on the set detection mode. Therefore, like the voice recognition device 100, the voice recognition device 200 is able to identify a control request based on the user's voiced instructions in a detection mode suitable for each control target device. Further, since the voice recognition device 200 is installed in the vehicle 1, control requests based on the user's voiced instructions suitable for each control target device can be identified regardless of the communication environment.

Third Embodiment

Figure 6:
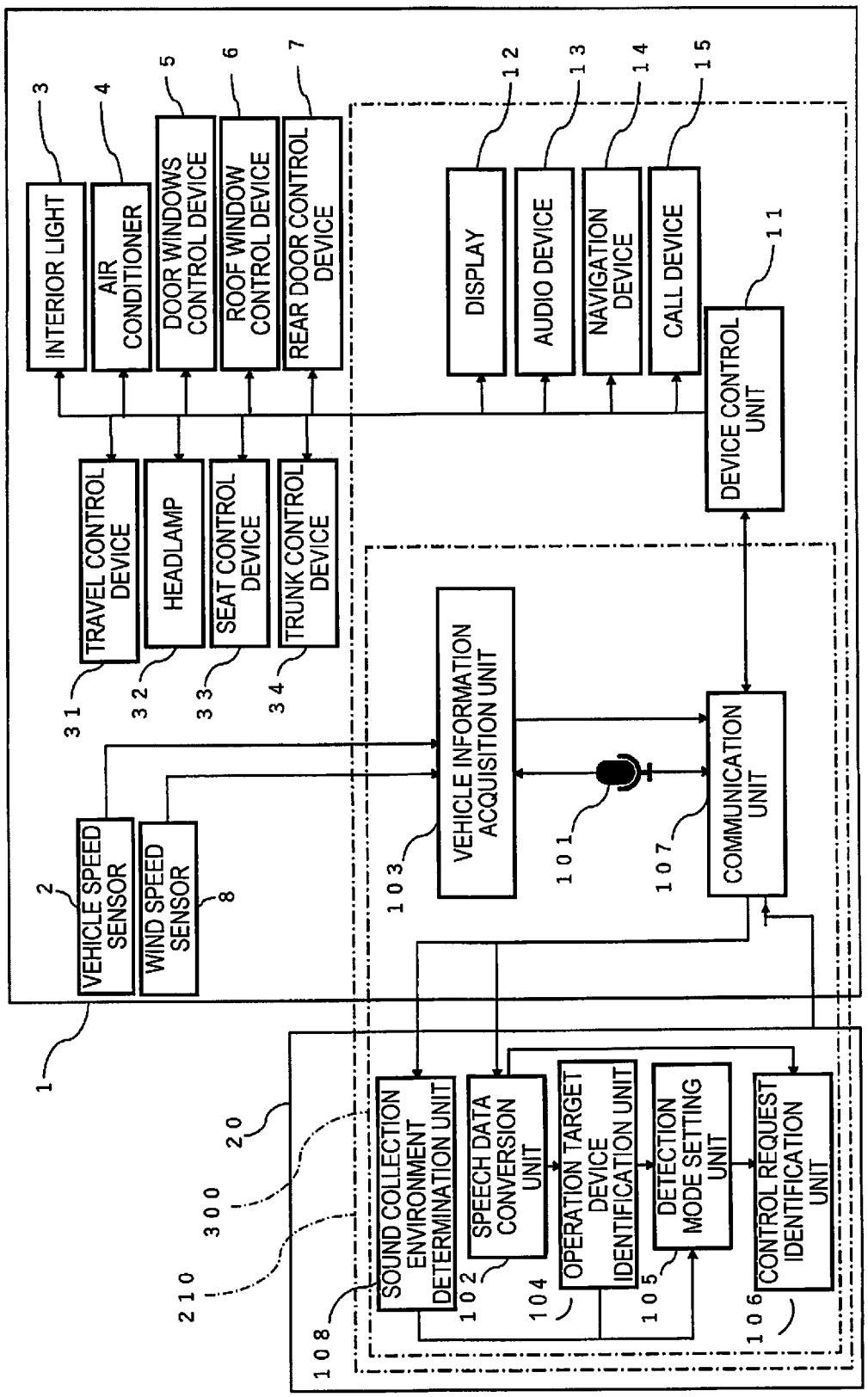
FIG. 6 is a block diagram showing the configuration of a vehicle that utilizes a voice recognition device according to a third embodiment of the present invention.

A voice recognition device 300 according to a third embodiment and a voice recognition method using the voice recognition device 300 will be described with reference to FIGS. 6-10. As shown in FIG. 6, the server 20 has a sound collection environment determination unit 108. The sound collection environment determination unit 108 determines whether the sound collection environment for the acquisition of speech by the speech acquisition unit 101 is favorable. Further, the vehicle 1 has a vehicle speed sensor 2 that detects the travel speed of the vehicle 1. The vehicle speed sensor 2 detects the travel speed of the vehicle 1 from the rotational speed of the wheels (wheel speed) of the vehicle 1, for example. Further, the vehicle 1 has a wind speed sensor 8 that detects the wind speed around the vehicle 1. Further, the vehicle 1 is provided with a vehicle information acquisition unit 103 that acquires state information of the vehicle 1. The vehicle information acquisition unit 103 is connected to the vehicle speed sensor 2 and the wind speed sensor 8 by wire or wirelessly. Further, the vehicle information acquisition unit 103 is also connected to the speech acquisition unit 101 and the communication unit 107 by wire or wirelessly. The vehicle information acquisition unit 103 constitutes a moving body information acquisition unit.

The display 12, the audio device 13, the navigation device 14, the call device 15, the device control unit 11, the speech acquisition unit 101, the vehicle information acquisition unit 103, and the communication unit 107 provided in the vehicle 1, and the sound collection environment determination unit 108, the speech data conversion unit 102, the control target device identification unit 104, the detection mode setting unit 105, and the control request identification unit 106 of the server 20, constitute a navigation system 210. Further, the speech acquisition unit 101, the vehicle information acquisition unit 103, and the communication unit 107 provided in the vehicle 1, and the sound collection environment determination unit 108, the speech data conversion unit 102, the control target device identification unit 104, the detection mode setting unit 105, and the control request identification unit 106 of the server 20 constitute the voice recognition device 300. That is, the voice recognition device 300 constitutes a part of the navigation system 210. Further, the voice recognition device 300 receives instructions voiced by the user and controls one or more or all of the on-board devices via the device control unit 11. That is, the navigation system 210 has the voice recognition device 1 that receives a request to control various types of devices installed in the vehicle 300 based on instructions voiced by the user in the vehicle 1. The voice recognition device 300 is a voice recognition system.

Here, the vehicle information acquisition unit 103 acquires state information of the vehicle 1 via the vehicle speed sensor 2, the wind speed sensor 8, the speech acquisition unit 101, and the communication unit 107. The state information of the vehicle 1 relates to elements that affect the acoustic environment of the interior of the vehicle 1. For example, the state information of the vehicle 1 includes the noise level of the interior of the vehicle 1; information regarding the open or closed state of openings, such as the door windows, the roof window, or the rear doors; the travel speed of the vehicle 1; the wind speed around the vehicle 1; the volume setting of the audio device 13; the air volume emitted from the air conditioner 4; and the like. The noise level of the interior of the vehicle 1 is the loudness of the noise detected by the speech acquisition unit 101, that is, the magnitude (e.g., measured value) of the sound other than that of the user's voice, and is calculated in units of dB (decibels). Further, the vehicle information acquisition unit 103 acquires, via the communication unit 107 and the device control unit 11, the volume setting of the audio device 13, the air volume emitted from the air conditioner 4, information regarding the open or closed state of the door windows, the roof window, the rear doors, and the like, as the state information of the vehicle 1. Further, the vehicle information acquisition unit 103 can also calculate the noise level of, for example, the interior of the vehicle 1 based on the magnitude of the noise in the interior of the vehicle 1 and the volume setting of the audio device 13, to acquire the calculated noise level as state information of the vehicle 1. Specifically, the noise level is calculated by summing the number of points assigned according to the loudness of the noise in the interior of the vehicle 1 and the number of points assigned according to the volume setting of the audio equipment 13. The noise level may be calculated using a value measured by a microphone provided in the interior of the vehicle 1, or be calculated using a value calculated by a microphone or vibration sensors provided on the body of the vehicle 1.

The sound collection environment determination unit 108 provided in the server 20 determines whether the sound collection environment of the interior of the vehicle 1 is favorable based on the state information of the vehicle 1 acquired by the vehicle information acquisition unit 103. The sound collection environment of the interior of the vehicle 1 is the environment in which the speech acquisition unit 101 of the voice recognition device 300 acquires the speech voiced by the user. The better the sound collection environment in the interior of the vehicle 1, the less noise (sounds other than those of the user's voice) is included in the speech acquired by the speech acquisition unit 101, and the more likely the voice recognition device 300 will accurately recognize the user's voiced instructions. On the other hand, the worse the sound collection environment in the interior of the vehicle 1, the more noise is included in the speech acquired by the speech acquisition unit 101, and the more likely the voice recognition device 300 will incorrectly identify, that is, misrecognize, the user's voiced instruction. The process of recognizing the user's voiced instructions includes the process of identifying the target device to be controlled and/or the process of identifying the contents of a control request with respect to the control target device.

Figure 7:
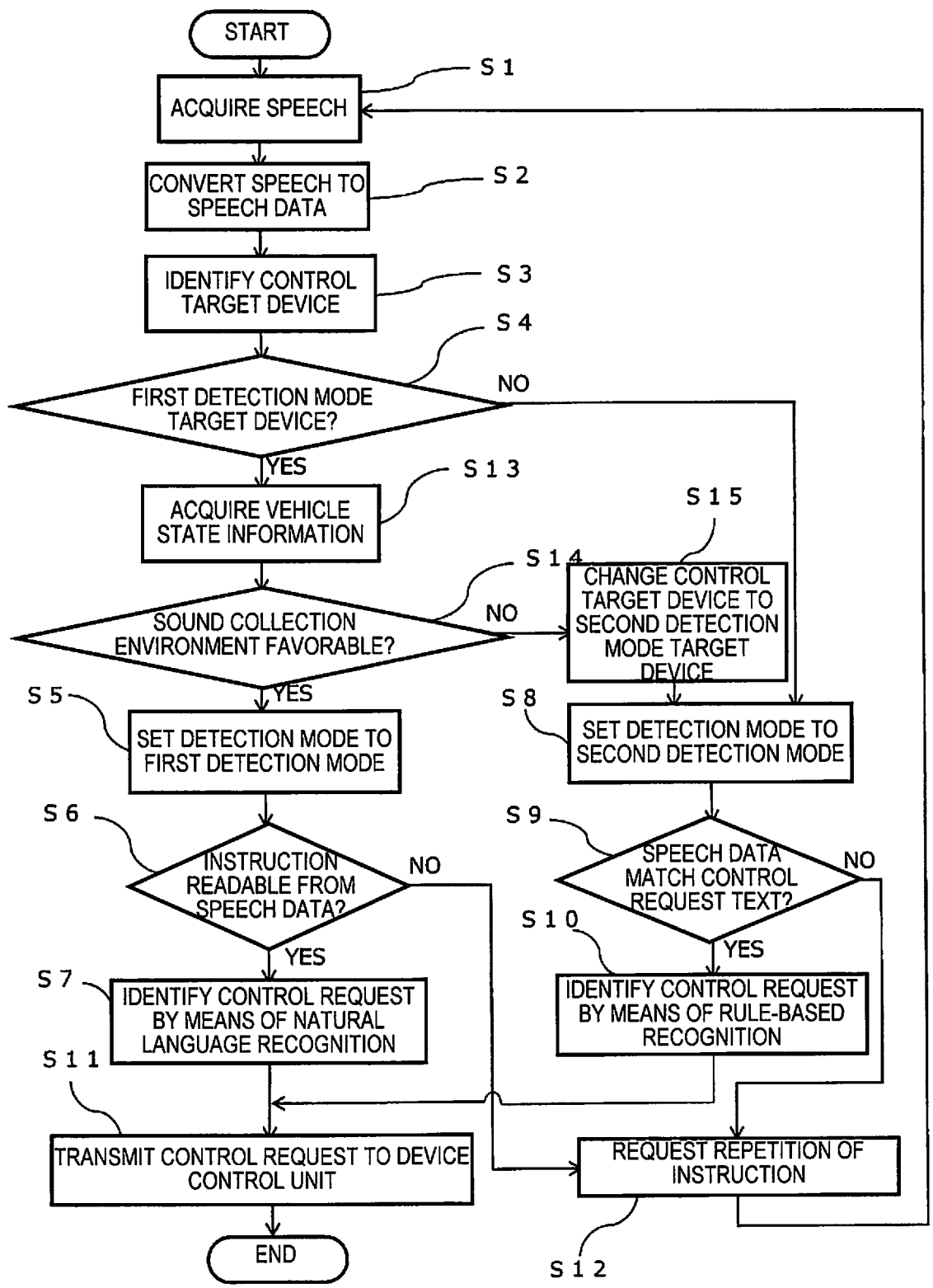
FIG. 7 is a flowchart showing the voice recognition method that uses the voice recognition device shown in FIG. 6.

Next, the procedure of the voice recognition method by means of the voice recognition device 300 will be described using the flowchart shown in FIG. 7. As shown in FIG. 7, if it is determined in Step S4 that the control target device is a first detection mode target device, in Step S13, the vehicle information acquisition unit 103 acquires the state information of the moving body, that is, the state information of the vehicle. Then, in Step S14, the sound collection environment determination unit 108 determines, based on the vehicle state information, whether the sound collection environment is favorable or unfavorable. The process of Step S13 may be executed in parallel with the processes of Step S1 to S4. The process of Step S13 may be performed continuously or periodically after the start of this control procedure. Further, the vehicle information acquisition unit 103 may continuously or periodically acquire the vehicle state information before this control procedure is started, and in the process of Step S13, extract and acquire the vehicle state information after the speech acquisition from the state information that was continuously or periodically acquired beforehand.

The criteria for determining whether the sound collection environment is favorable or unfavorable based on the vehicle state information will be explained here with reference to FIG. 8. Whether the sound collection environment is favorable or unfavorable is determined by a misrecognition level based on the state information of the vehicle 1. The misrecognition level is an index indicating the probability that the voice recognition device 300 cannot accurately recognize the speech voiced by the user and cannot identify the correct control request. In the example shown in FIG. 8, the misrecognition level is expressed as a quantitative index value. That is, the higher the index value of the misrecognition level, the greater the probability that the user's voiced instruction will be misrecognized due to the high noise level in the interior of the vehicle 1 and the increased inability of the speech data conversion unit 102 to accurately convert speech into speech data. Therefore, the higher the index value of the misrecognition level, the less favorable the sound collection environment. In the table shown in FIG. 8, the number of points to be added to the misrecognition level (index value) are defined in accordance with the state information of the vehicle 1. FIG. 8 shows an example of the method for calculating the misrecognition level; the number of points to be added and the items that can be added can be defined in advance in accordance with the vehicle characteristics, the characteristics of the voice recognition device, or the like.

As shown in FIG. 8, the number of points to be added to the misidentification level when the roof window W 1 or door window W 2 of vehicle 1 is open is one. Further, when the air volume of the air conditioner 4 is greater than or equal to a preset reference air volume set, the number of points to be added is two. Further, when the roof window W1 or the door window W2 is open, and the travel speed of the vehicle 1 is greater than or equal to 20 km/h or less than 80 km/h, the number of points to be added to the misrecognition level is two. Further, when the roof window W1 or the door window W2 is open, and the travel speed of the vehicle 1 is greater than or equal to 80 km/h, the number of points to be added to the misrecognition level is three. Further, when the noise level of the interior of the vehicle 1 is greater than or equal to a preset reference noise level, the number of points to be added to the misrecognition level is three. The roof window W1 and the door window W2 of the vehicle 1 constitute the openings of the vehicle 1. The openings of the vehicle 1 are not limited to the roof window W1 or the door window W2, but may be, for example, a door of the vehicle 1.

The misrecognition level (index value) of the sound collection environment is calculated by adding the number of points shown on the right side of the table of FIG. 8 in accordance with the state information of the vehicle 1. For example, when the roof window W1 is open and the vehicle speed is greater than or equal to 20 km/h and less than 80 km/h, the number of points indicating the misrecognition level is calculated as three points by adding one point and two points. Further, when the roof window W1 is open, the air conditioner air volume is greater than or equal to the reference air volume, and the vehicle speed is greater than or equal to 80 km/h, the number of points indicating the misrecognition level is calculated as six points by adding one, two, and three points.

In Step S14, the sound collection environment determination unit 108 sets the reference level of the misrecognition level to four points, determines that the sound collection environment is favorable when the misrecognition level is less than the reference level of four points, and determines that the sound collection environment is unfavorable when the misrecognition level is greater than or equal to four points. The number of points of the reference level can be defined in advance in accordance with the characteristics, etc., of the voice recognition device. Further, the number of points of the reference level can be defined in advance based on experiments or simulations.

In Step S14, if it is determined that the sound collection environment is favorable, in Step S5 the detection mode setting unit 105 sets the detection mode to the first detection mode. That is, if the sound collection environment determination unit 108 determines that the sound collection environment is favorable and the control target device identification unit 104 determines that the control target device is a first detection mode target device, the detection mode setting unit 105 sets the detection mode to the first detection mode.

In Step S14, if it is determined that the sound collection environment is unfavorable, on the other hand, in Step S15 the control target device identification unit 104 changes the setting of the control target device from a first detection mode target device to a second detection mode target device. That is, if the sound collection environment determination unit 108 determines that the sound collection environment is unfavorable, the control target device identification unit 104 changes and resets the control target device, which was previously set as a first detection mode target device, to a second detection mode target device. The server 20 outputs information indicating the change in the setting of the control target device, that is, information including the fact that the setting of the control target device has been changed from a first detection mode target device to a second detection mode target device, to the display 12 or the audio device 13 via the communication unit 107 and the device control unit 11 of the vehicle 1. Then, in Step S8, the detection mode setting unit 105 sets the detection mode to the second detection mode.

Figure 9:
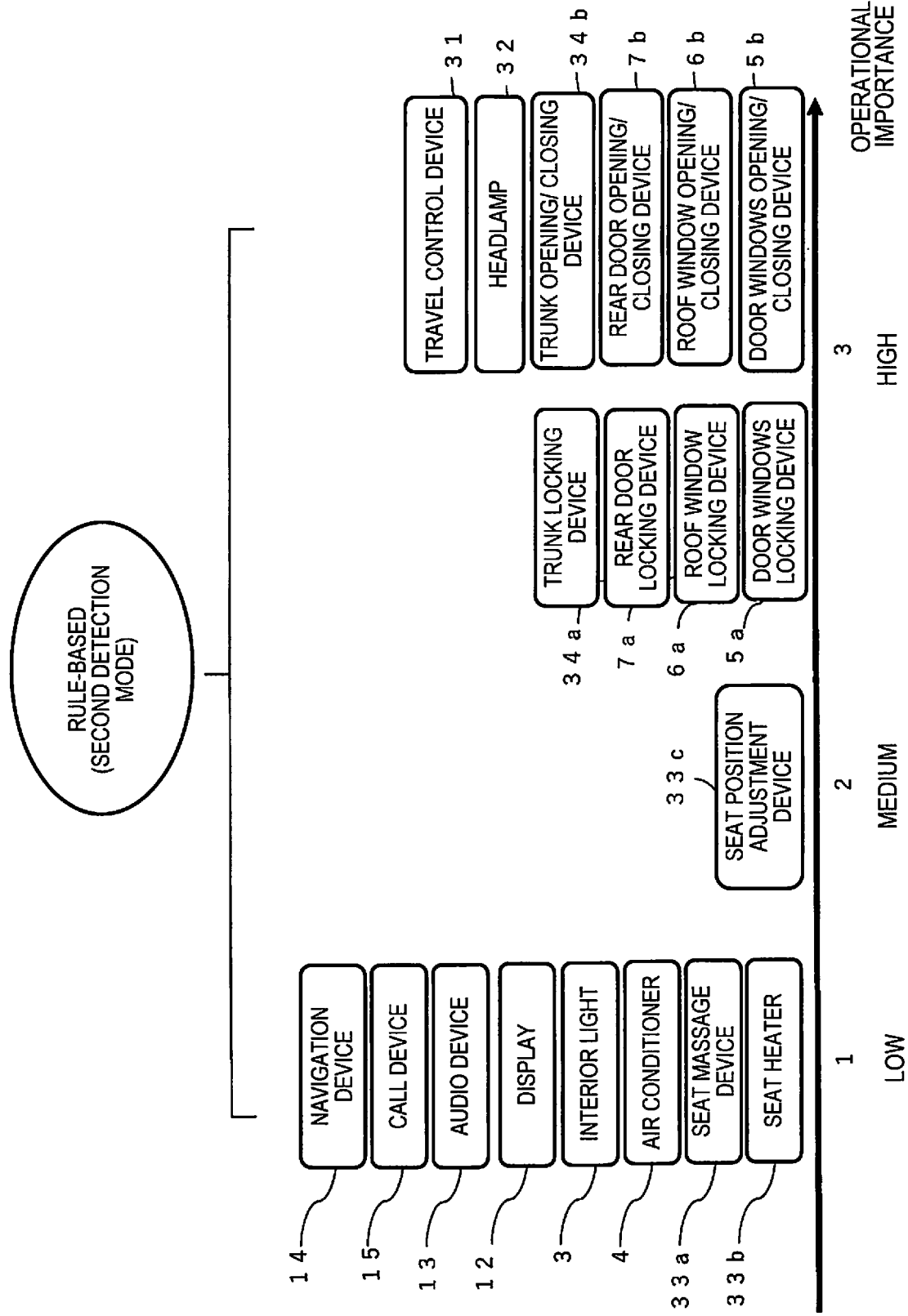
FIG. 9 is a diagram showing the correspondence relationship between the control target device and the detection mode when it is determined that the sound collection environment is unfavorable in the voice recognition method shown in FIG. 7.

Here, FIG. 9 shows an example in which, in step S15, the control target device identification unit 104 changes and resets the setting of the control target device from a first detection mode target device to a second detection mode target device. In Step S14, if it is determined that the sound collection environment is unfavorable, the navigation device 14, the call device 15, the audio device 13, the display 12, the interior light 3, the air conditioner 4, the seat massage device 33*a*, and the seat heater 33*b*, classified as having an operational importance of "1 (Low)," as shown in FIG. 9, are determined to be second detection mode target devices, and the control request is identified as the second detection mode based on rule-based recognition. Further, the seat position adjustment device 33*c*, which is classified as having an operational importance of "2 (Medium)," is also determined to be a second detection mode target device, and the control request is identified as the second detection mode based on rule-based recognition.

The settings of the travel control device 31, the headlamps 32, the door windows locking device 5a, the door windows opening/closing device 5b, the roof window locking device 6a, the roof window opening/closing device 6b, the rear doors locking device 7a, the rear doors opening/closing device 7b, the trunk locking device 34a, and the trunk opening/closing device 34b, which are classified as having an operational importance of "3 (High)," are not changed. Therefore, if it is determined that the sound collection environment is unfavorable in Step S14, the control target devices are all set as second detection mode target devices, and the second detection mode based on rule-based recognition is applied to all of the identifications of the control requests with respect to the control target devices.

As described above, in this embodiment of the voice recognition device 300 and the voice recognition method using the voice recognition device 300, if the sound collection environment determination unit 108 determines that the sound collection environment is favorable and the control target device identification unit 104 determines that the control target device is a first detection mode target device, the detection mode setting unit 105 sets the detection mode to the first detection mode. Therefore, the voice recognition device 300 applies the first detection mode based on natural language recognition to the first detection mode target device whose operational importance is not very high only when the sound collection environment is favorable, i.e., when there is little noise in the sound collection environment, and identifies the control request. That is, the voice recognition device 300 is configured to avoid the application of the first detection mode based on natural language recognition in a noisy sound collection environment. Thus, the voice recognition device 300 can reduce the probability of misrecognition, even when identifying a control request by means of natural language recognition, which has a high degree of flexibility of speech that can be input, so that the control request with respect to the control target device can be more reliably identified.

Further, if the sound collection environment determination unit 108 determines that the sound collection environment is unfavorable, the control target device identification unit 104 changes and resets the control target device, which was preset as a first detection mode target device, to a second detection mode target device. Here, if the sound collection environment is unfavorable, that is, a noisy sound collection environment, the probability of misrecognition in the identification of control requests increases. Therefore, a control target device that was preset as a first detection mode target device can be reset as a second detection mode target device, and the second detection mode based on rule-based recognition can be applied to identify the control request, thereby preventing misrecognition.

The sound collection environment determination unit 108 acquires the air volume emitted from the air conditioner 4, which is an air-conditioning device, as state information. Since the higher the air volume of the of the air conditioner 4, the more noise tends to become mixed with the speech acquired by the speech acquisition unit 101, by acquiring the air volume emitted from the air conditioner 4 as the state information, the sound collection environment determination unit 108 is able to better assess whether the sound collection environment is favorable or unfavorable.

Further, the sound collection environment determination unit 108 acquires as state information the opened/closed state of the roof window W1 or the door window W2, which are openings provided in the vehicle 1, and the travel speed of the vehicle 1 when the roof window W1 or the door window W2 is open. This is because when the vehicle 1 is traveling with an open roof window W1 or door window W2, noise that enters the interior of the vehicle 1 from the outside, such as wind noise, the sound of oncoming vehicles, and the like, increases as the travel speed of the vehicle 1 increases. Therefore, by acquiring the opened/closed state of the roof window W1 or the door window W2 and the travel speed of the vehicle 1 as state information, the sound collection environment determination unit 108 is able to better assess whether the sound collection environment is favorable or unfavorable.

Further, the sound collection environment determination unit 108 acquires as state information the opened/closed state of the roof window W1 or the door window W2, which are openings provided in the vehicle 1, and the wind speed around the vehicle 1 when the roof window W1 or the door window W2 is opened. This is because when roof window W1 or door window W2 of the vehicle 1 is open, the air volume that blows into the interior of the vehicle 1 increases, raising the noise level as the wind speed around the vehicle 1 increases. Even if the vehicle 1 is not traveling but is stopped, if the roof window W1 or the door window W2 is open, the wind speed around the vehicle 1 affects the sound collection environment in the interior of the vehicle 1. Therefore, by acquiring as state information the opened/closed state of the roof window W1 or the door window W2 and the wind speed around the vehicle 1, the sound collection environment determination unit 108 is able to better assess whether the sound collection environment is favorable or unfavorable. The openings of the vehicle 1 are not limited to the roof window W1 and the door window W2, and may be other windows or doors.

Further, the sound collection environment determination unit 108 acquires the noise level in the interior of the vehicle 1 as state information. Since the higher the noise level in the interior of the vehicle 1, the more noise tends to become mixed with the speech acquired by the speech acquisition unit 101, by acquiring the noise level in the interior of the vehicle 1 as state information, the sound collection environment determination unit 108 is able to better assess whether the sound collection environment is favorable or unfavorable.

Further, in the case that the control target device identification unit 104 changes and resets a control target device that was preset as a first detection mode target device to a second detection mode target device, the voice recognition device 300 outputs information indicating the change in the setting of the control target device to the display 12 or the audio device 13 provided in the vehicle 1. This ensures that the user can reliably confirm that the setting of the control target device has been changed from a first detection mode target device to a second detection mode target device, and the user can more readily voice an instruction that conforms to the current setting of the control target device.

Figure 10:
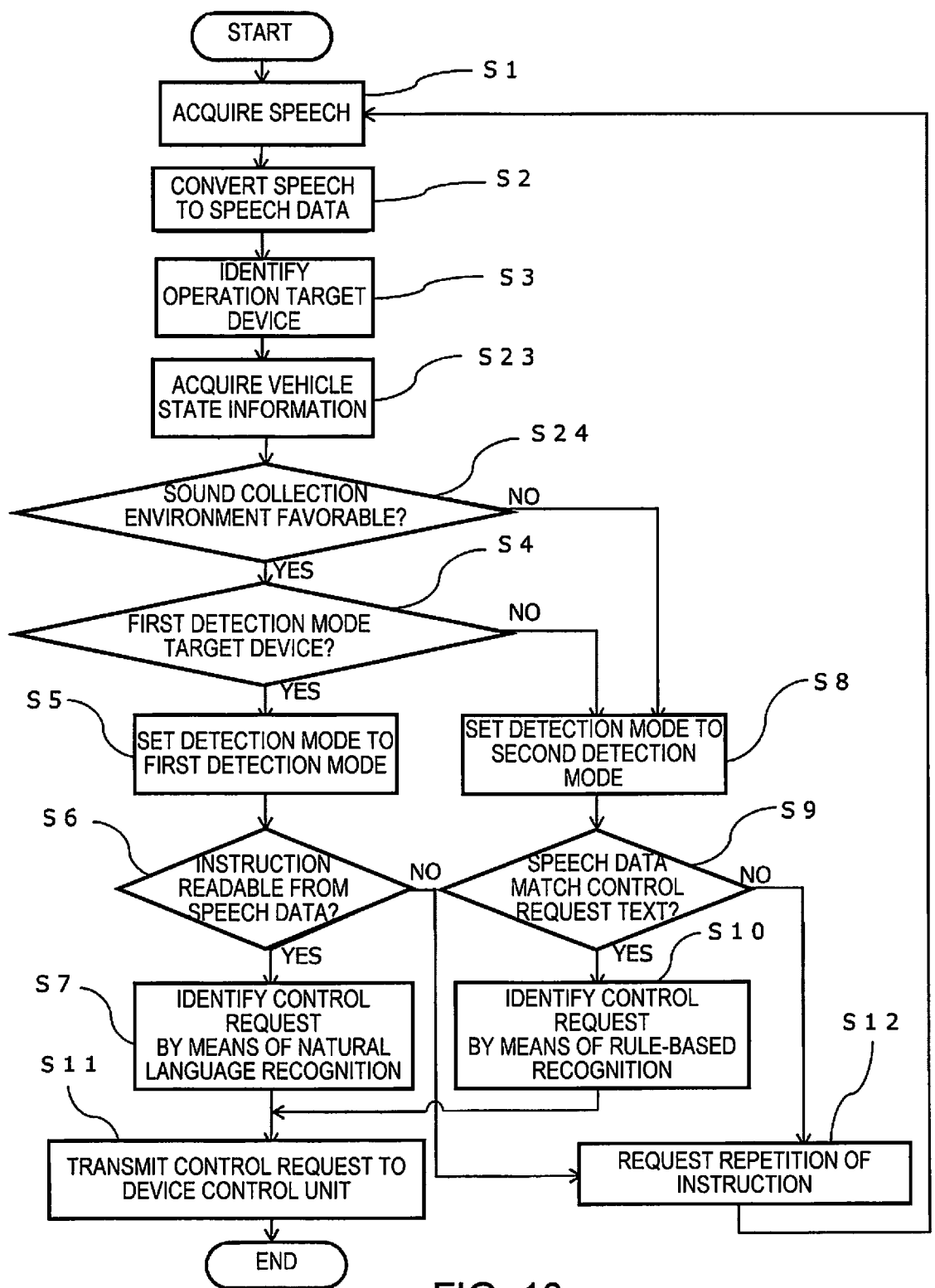
FIG. 10 is a flowchart showing another example of a voice recognition method that uses the voice recognition device shown in FIG. 6.

The voice recognition method using the voice recognition device 300 according to this embodiment is not limited to the processing steps shown in FIG. 7. Another example of the voice recognition method using the voice recognition device 300 is shown in FIG. 10. As shown in FIG. 10, if, in Step S3, the control target device is identified, in Step S23 the vehicle information acquisition unit 103 acquires the vehicle state information. The process of Step S23 may be executed in parallel with the processes of Step S1 to S4. Then, in Step S24, the sound collection environment determination unit 108 determines whether the sound collection environment is favorable or unfavorable based on the vehicle state information. In Step S24, if it is determined that the sound collection environment is unfavorable, the voice recognition device 300 uniformly sets the detection mode to the second detection mode without determining whether the control target device is a first detection mode target device. In other words, if the sound collection environment determination unit 108 determines that the sound collection environment is favorable and the control target device identification unit 104 determines that the control target device is a second detection mode target device, or if the sound collection environment determination unit 108 determines that the sound collection environment is unfavorable, the detection mode setting unit 105 sets the detection mode to the second detection mode. In this case as well, if it is determined that the sound collection environment is unfavorable, as shown in FIG. 9, all of the control target devices are set to second detection mode target devices, and the second detection mode based on rule-based recognition is applied to all of the identifications of the control requests with respect to the control target devices. The voice recognition device 300 can thereby reduce the probability of misrecognition, even when identifying control requests by means of natural language recognition, which has a high degree of flexibility of speech that can be input.

Further, the vehicle information acquisition unit 103 can acquire the travel state of the vehicle 1 as state information of the vehicle 1. In this case, when it is determined that the vehicle 1 is stopped based on the travel state of the vehicle 1, the control target device identification unit 104 can change and reset the control target device, which was preset as a second detection mode target device, to a first detection mode target device. Specifically, the headlamps 32, the door windows locking device 5a, the door windows opening/closing device 5b, the roof window locking device 6a, the roof window opening/closing device 6b, the rear doors locking device 7a, the rear doors opening/closing device 7b, the trunk locking device 34a, and the trunk opening/closing device 34b, which are second detection mode target devices shown in FIG. 3, have little influence on the user while the vehicle 1 is stopped. Therefore, the settings of these on-board devices may be changed to the first detection mode target device, and the control requests may be identified by means of the first detection mode based on natural language recognition, which has a high degree of flexibility of speech that can be input. That is, while the vehicle 1 is stopped, all of the control target devices may be set as first detection mode target devices, and the first detection mode based on natural language recognition may be applied to all of the identifications of the control requests with respect to the control target devices. Further, in the case that the control target device identification unit 104 changes and resets a control target device that was preset as a second detection mode target device to a first detection mode target device, the voice recognition device 300 may output information indicating the change in the setting of the control target device to the display 12 or the audio device 13 provided in the vehicle 1.

Further, the voice recognition devices 100, 200, and 300 may set the first detection mode or the second detection mode in accordance with the identified control target device regardless of whether the natural language recognition or rule-based recognition is used as the method of voice recognition. For example, both the first detection mode and the second mode may be based on natural language recognition. In this case as well, the second detection mode has a narrower range of the speech data that can be recognized in accordance with each control request than the first detection mode. Specifically, the first detection mode may be a detection mode based on multi-intent type natural language recognition, and the second detection mode may be a detection mode based on single-intent type natural language recognition. In a detection mode based on multi-intent type natural language recognition, the control request identification unit 106 can identify two control target devices (air conditioner 4 and door window W2) and the control request ("I want to turn OFF the air conditioner" and "I want to open the door window") for each control target device, from a voiced instruction that contains two or more control requests, such as "turn off the air conditioner and open the window," or the like. On the other hand, in a detection mode based on single-intent type natural language recognition, the control request identification unit 106 can identify a control request only when one control request is included per voiced instruction, such as "turn off the air conditioner" or "open the window."

Further, as shown in FIG. 3, the voice recognition devices 100, 200, and 300 may change the method of natural language recognition depending on whether the control target device is classified as having an operational importance of "1 (Low)" or an operational importance of "2 (Medium)." Specifically, the detection mode setting unit 105 may set the first detection mode based on multi-intent type natural language recognition with respect to a control target device classified as having an operational importance of "1 (Low)" and set the first detection mode based on single-intent type natural language recognition with respect to a control target device that is classified as having an operational importance of "2 (Medium)." Not limited thereto, the detection mode setting unit 105 may set detection modes based on natural language recognition by means of two or more types of methods, as deemed suitable, depending on the first detection mode target device.

Further, the moving body is not limited to a vehicle, but may be a train or an airplane.

The vehicle 1 described above corresponds to a moving body according to the present invention. The interior light 3 described above corresponds to the environment adjustment device according to the present invention. The air conditioner 4 described above corresponds to the environment adjustment device and the air conditioning device according to the present invention. The display 12 described above corresponds to the information provision device according to the present invention. The audio device 13 described above corresponds to the environment adjustment device and the information provision device according to the present invention. The vehicle information acquisition unit 103 described above corresponds to the moving body information acquisition unit according to the present invention. The roof window W1 and the door window W2 described above correspond to the openings of the present invention.

The invention claimed is:

1. A voice recognition device that receives a request to control devices installed in a moving body, based on an instruction voiced by a user, the voice recognition device comprising:
   a speech acquisition unit configured to acquire speech;
   a speech data conversion unit configured to convert the speech acquired by the speech acquisition unit into speech data;

a control target device identification unit configured to analyze the speech data converted by the speech data conversion unit to identify a control target device to be operated;

a detection mode setting unit configured to set either a first detection mode that analyzes the speech data by natural language recognition, or a second detection mode for determining whether the speech data match a predefined control request text, as a detection mode for identifying the control request corresponding to the speech data in accordance with the control target device identified by the control target device identification unit; and a control request identification unit configured to analyze the speech data to identify the control request with respect to the control target device, based on the detection mode set by the detection mode setting unit.

2. The voice recognition device according to claim 1, wherein the detection mode setting unit is configured to set the detection mode to the first detection mode when the identified control target device is a first detection mode target device, and set the detection mode to the second detection mode when the identified control target device is a second detection mode target device, where the second detection mode has a narrower range of the speech data that can be recognized in accordance with each of the control requests than the first detection mode.

3. The voice recognition device according to claim 2, wherein when the detection mode setting unit sets the detection mode to the second detection mode, the control request identification unit is configured to determine whether the speech data match a predefined control request text, and identify the control request corresponding to the control request text when it is determined that the speech data match the control request text.

4. The voice recognition device according to claim 3, wherein when the detection mode is set to the second detection mode, and the speech data based on the voiced instruction do not match the control request text, the control request identification unit is configured to output guide information to an information provision device provided in the moving body for guiding the user to redo the instruction such that the speech data match the control request text.

5. The voice recognition device according to claim 2, wherein when the control target device is identified to be a travel control device for controlling the travel of the moving body, the control target device identification unit is configured to determine that the control target device is the second detection mode target device.

6. The voice recognition device according to claim 2, wherein when the control target device is identified to be a locking device of the trunk, a door, or a window, or an opening/closing device of the trunk, a door, or a window of the moving body, the control target device identification unit is configured to determine the control target device to be the second detection mode target device.

7. The voice recognition device according to claim 2, wherein when the control target device is identified to be an environment adjustment device that adjusts ambient conditions, including at least one of temperature, light intensity, and sound volume inside the moving body, the control target device identification unit is configured to determine the control target device to be the first detection mode target device.

8. The voice recognition device according to claim 2, wherein when the control target device is identified to be a seat control device that controls the seating state of a seat provided inside the moving body, the control target device identification unit is configured to determine that the control target device is the first detection mode target device.

9. The voice recognition device according to claim 2, wherein when the control target device is identified to be an information provision device that provides information to the user, the control target device identification unit is configured to determine that the control target device is the first detection mode target device.

10. The voice recognition device according to claim 2, further comprising a moving body information acquisition unit configured to acquire state information of the moving body, and a sound collection environment determination unit configured to determine whether a sound collection environment for acquiring speech is favorable or unfavorable based on the state information of the moving body acquired by the moving body information acquisition units, wherein if the sound collection environment determination unit determines that the sound collection environment is favorable and the control target device identification unit determines that the control target device is the first detection mode target device, the detection mode setting unit sets the detection mode to the first detection mode.

11. The voice recognition device according to claim 10, wherein if the sound collection environment determination unit determines that the sound collection environment is unfavorable, the control target device identification unit changes and resets the control target device, which was preset as the first detection mode target device, to the second detection mode target device.

12. The voice recognition device according to claim 10, wherein the moving body information acquisition unit is configured to acquire the air volume emitted from an air conditioning device provided in the moving body as the state information.

13. The voice recognition device according to claim 10, wherein the moving body information acquisition unit is configured to acquire the opened/closed state of an opening provided in the moving body the and travel speed of the moving body if the opening is open as the state information.

14. The voice recognition device according to claim 10, wherein the moving body information acquisition unit is configured to acquire the opened/closed state of an opening provided in the moving body and wind speed around the moving body if the opening is open as the state information.

15. The voice recognition device according to claim 2, further comprising
a moving body information acquisition unit configured to acquire state information of the moving body, wherein
the moving body information acquisition unit is configured to acquire travel information of the moving body as the state information, and
upon determining that the moving body is stopped based on the travel state of the moving body, the control target device identification unit changes and resets the control target device, which was preset as the second detection mode target device, to the first detection mode target device.

16. The voice recognition device according to claim 2, wherein
if the control target device identification unit changes and resets the control target device, which was preset as the first detection mode target device, to the second detection mode target device, or changes and resets the control target device, which was preset as the second detection mode target device, to the first detection mode target device, information indicating the change in the setting of the control target device is output to an information provision device provided in the moving body.

17. The voice recognition device according to claim 1, wherein
the control target device identification unit analyzes the speech data based on natural language recognition, to identify a control target device.

18. The voice recognition device according to claim 1, wherein
the detection mode setting unit is configured to set the detection mode in accordance with classification of control target device determined in accordance with operational importance.

19. A voice recognition method using a voice recognition device that receives a request to control devices installed in a moving body based on an instruction voiced by a user, the voice recognition method comprising:
acquiring speech;
converting the acquired speech to speech data;
analyzing the speech data to identify a control target device;
setting a detection mode to either a first detection mode that analyzes the speech data by natural language recognition, or a second detection mode for determining whether the speech data match a predefined control request text for detecting the control request corresponding to the speech data in accordance with the control target device; and
analyzing the speech data to identify the control request with respect to the control target device based on the set detection mode.

* * * * *